Patented May 14, 1946

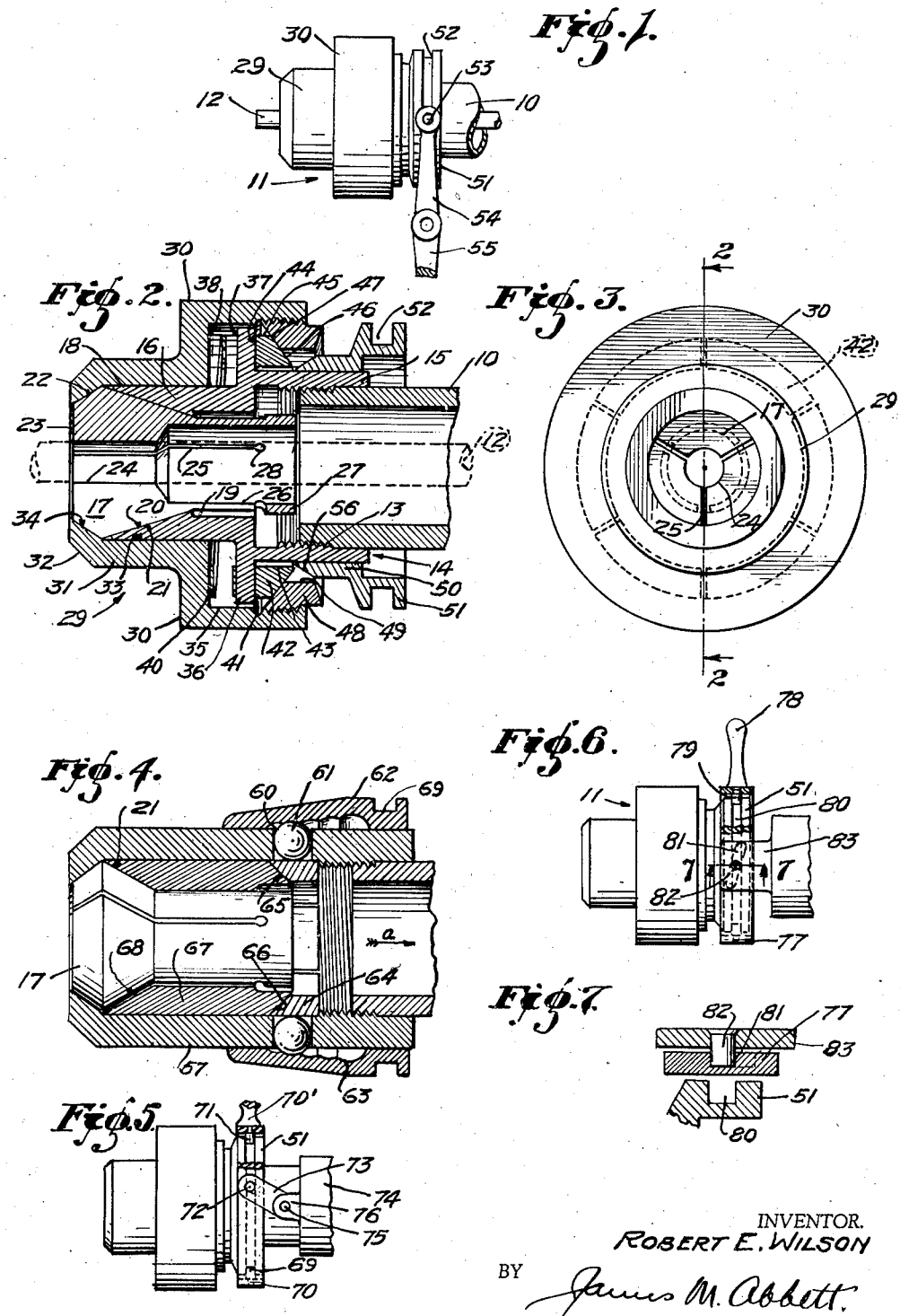

2,400,183

UNITED STATES PATENT OFFICE 2,400,183

COLLET TYPE CHUCK

Robert E. Wilson, Upland, Calif.

Application October 18, 1943, Serial No. 506,768

2 Claims. (Cl. 279—50)

This invention relates to machine tools, and particularly pertains to a collet type chuck.

In machine tool practice, and particularly automatic screw machine operations, it is desirable to provide a collet type chuck through which the work stock may be fed and by which the stock may be gripped intermittently for various machine tool operations. Due to the fact that machinery requiring chucks of this type operate at high speed, it is desirable to provide a chuck which will grip and release the stock rapidly, and it is preferably that this operation take place without interrupting the driving action of the chuck. Various types of structures of this kind have been made but in many instances they have involved the use of a large number of parts and have been subjected to excessive wear so that the chuck is liable to get out of order. It is desirable, therefore, to provide a chuck of the collet type, which will operate under conditions of continuous rotation, and which may be easily set and released. It is the object of the present invention to provide a chuck having a relatively few parts which may be easily assembled, and which may be manipulated while the chuck is in continuous rotation to grip the work stock or to release it.

The present invention contemplates the provision of a chuck head carrying a sleeve fitted with radially moving dogs, and which sleeve may be reciprocated during rotation of the chuck to grip or release work stock extending therethrough.

The invention is illustrated by way of example in the accompanying drawing in which:

Figure 1 is a fragmentary view in side elevation showing a chuck embodying the present invention as mounted upon a tubular driving spindle.

Fig. 2 is an enlarged view in longitudinal section showing the chuck in its gripping position.

Fig. 3 is a view in end elevation showing the various elements of the chuck structure.

Fig. 4 is a view in longitudinal section and elevation showing another form of the chuck embodying the present invention.

Fig. 5 is a view in plan showing an improved form of shifting yoke for the chuck.

Fig. 6 is a view in elevation with parts broken away showing another form of chuck shifting mechanism.

Fig. 7 is a fragmentary view in section as seen on the line 7—7 of Fig. 6, showing the details of construction of the device.

Referring more particularly to the drawing, 10 indicates the driving spindle of a machine tool, such, for example, as an automatic screw machine. Detachably mounted upon the free end of the spindle 10 is a collet chuck 11 within which the present invention is embodied. Extending through the spindle 10 and the chuck 11 is a piece of work stock 12, here indicated as a piece of metal of circular cross-section and which is to be fed to a suitable cutter head. The free end of the spindle 10 is threaded, as indicated at 13, and extends into a chuck body member or head 14. This member includes a tubular hub 15, which is internally threaded to receive the threaded end 13 of the spindle 10, and an outer cylindrical portion 16 to receive a set of chuck jaws 17. The outer surface of the portion 16 is cylindrical, as indicated at 18, while the inner portion of the member 16 is formed with a cylindrical bore 19 terminating in an outwardly flaring face 20 to receive the inclined back portions 21 of the chuck jaws 17. These jaws, as shown in Fig. 2 of the drawing, have an inwardly inclined face 22 at the outer end of the inclined face 21 and an end face 23 which is disposed substantially at right angles to the longitudinal axis of the chuck. Parallel to the longitudinal axis of the chuck each of the jaws is formed with a gripping face 24 which engages the stock 12 and holds it. The length of the gripping faces 24 are also required to afford a sufficient gripping action upon the stock. These jaws extend inwardly and are arcuate in transverse section, as shown in Fig. 3 of the drawing. Here it will be seen that three of the jaws are provided, and that the surfaces 21, 22 and 24 are arcuate and concentric with the longitudinal axis of the chuck. The jaws represent portions of a segment of a circle and are of a circumferential dimension sufficient to allow radial spaces 25 to occur between the jaws so that, as the jaws expand and contract they will have clearance with relation to each other. The jaws 17 have inner end portions 26 which are described by circles of greater diameter than the gripping surface 24 and give clearance for the stock which is passing through the machine. The jaws are formed integral with an annular ring portion 27 which occurs at the inner end of the jaws, it being understood that the jaws 17 and the member 27 have been made from one piece of material, and that the spaces 25 between the paws are produced by slots which are cut longitudinally of the member until reaching the depth of the ring 27. At the base of each of the longitudinal slots 25 a drilled hole 28 occurs, which is of larger diameter than the width of the slots 25 and tends to add to the resilience of the individual portions 26 as well as prevent the jaws from cracking and becoming separated from their common ring support 27. The portions 26 of the jaws extend longitudinally through the cylindrical bore 19 of the chuck head 14, this bore being of a diameter sufficiently large to accommodate the outside diameter of the ring 27.

Mounted over the chuck head or body 14 is a setting sleeve 29. This sleeve is formed with a cylindrical body portion 30 of relatively large diameter and a cylindrical nose 31 which projects forwardly therefrom and houses the outer end of the body 14 and the chuck jaws 17. For purposes of clearance the end of the portion 31 is beveled off, as indicated at 32. The nose 31 is formed with a central bore 33 which is cylindrical and of a diameter to agree with the outside diameter of the cylindrical face 18 of the member 16. The fit between these two faces is preferably a close running fit. At the outer end of the cylindrical portion 23 is an inwardly inclined annular tapered face 34 which agrees in angular relation to the tapered end face 32 of each of the jaws 17, and as will be hereinafter described cooperates in moving the jaws to a gripping position and also restrains the jaws from becoming disassembled from the chuck structure. The large cylindrical portion 30 of the gripping sleeve 29 is formed with a large inner bore 35 with which the bore 33 of the nose of the sleeve communicates. The bore 35 accommodates an annular flange 36 formed integral with the body member 14. This flange is disposed in a plane at right angles to the longitudinal axis of the chuck and has a front face 37 which is spaced from a face 38 formed in the cylindrical portion 30 of the sleeve 29. The space occurring between these two faces accommodates a flat spring washer 40 which tends to hold the sleeve 29 in its foremost position with relation to the body member 14. The flange 36 is formed with a rear face 41 against which a plurality of arcuate expanding blocks 42 bear. These expanding blocks are shown in Fig. 3 of the drawing as being six in number and of a diameter to properly circumscribe the outer circumference of the tubular portion 15 of the body member and to be encompassed by the cylindrical portion 30 of the sleeve. As shown in Fig. 2 of the drawing, the expanding blocks 42 are formed with an arcuate inner face 43 which lies on a circumferential line somewhat larger in diameter than that of the outside diameter of the tubular portion 15 of the body 14, thus allowing contraction of the members 42. The forward face 44 of each of the blocks 42 is flat and coincides with the face 41 of the flange 36. The outer face 45 of each of the blocks 42 is arcuate and concentric with the inner face 43. The back face of each of the blocks 42 is inclined, as shown at 46. This face is engaged by a face 47 of similar inclination formed upon a nut 48. The nut is threaded into the open end of the bore 35 in the cylindrical portion 30 of the sleeve 29. The nut is ring-shaped and has a central bore 49 which accommodates the outer diameter of a hub 50 slidably mounted upon the tubular portion 15 of the body member and to which is integrally formed a shifting collar 51. The collar 51 is provided with the usual pin groove 52 to receive shifting pins or rollers 53 carried by the yoke arms 54 of a shifting lever 55. Thus, by oscillation of the lever 55 the yoke and its hub may be reciprocated to set or release the chuck jaws 17. The hub 50 of the shifting collar 51 is formed at its forward end with an outwardly tapering face 56 which may slip into the space between the faces 43 of the expanding blocks 42, and will thus move the blocks outwardly.

In operation of the present invention the chuck is assembled as shown in the drawing and is mounted upon the driving spindle 10. A piece of work stock 12 is passed through the spindle and the chuck to be engaged by the cutters of suitable machine tools. When the spindle is rotated it will rotate the chuck head or body member 14, which is threaded onto the end of the spindle and rotates in unison therewith. The spring 40 acts to move the setting sleeve 29 forwardly so that the gripping jaws 17 may move away from a gripping position with relation to the stock 12. When it is desired to grip the stock 12 within the chuck the shifting collar 51 is moved forwardly over the body member 14 by swinging movement of the lever 55. This will force the tapered cone 56 into the space between the expanding blocks 42 and the tubular portion 15 of the member 14 and will tend to force the blocks outwardly along the inclined seat 47 of the nut 48. As this takes place the forward faces of the expanding blocks 42 will be forced against the rear face 41 of the flange 36, and thus the setting sleeve 29 will move rearwardly over the body member 14 as the faces 46 of the expanding blocks 42 bear against the inclined face 47 of the ring nut 48. As this takes place the inclined face 34 of the nose portion 31 of the setting sleeve 29 will engage the inclined faces 22 at the ends of the gripping jaws 17 and will tend to force the jaws rearwardly and inwardly. As they move rearwardly the inclined faces 20 and 21 of the body member and jaws will engage each other to swing the jaws simultaneously inwardly. It will also be seen that due to the arrangement of the expanding blocks 42 the shifting movement of the collar 51 will insure that the setting sleeve 29 is frictionally engaged over a relatively large surface. This causes the chuck to be positively driven from the spindle without any complicated chuck mechanism, and also insures that the chuck may be instantly released when the collar 51 is drawn toward its retracted position, since at that time the spring washer 40 will act to move the setting sleeve 29 forwardly so that the gripping jaws 17 will be released. It is to be understood that since these jaws are all formed integral with the ring 27 they will have sufficient inherent resilience to swing outwardly to a retracted position when the setting sleeve 29 moves forwardly toward a non-setting position.

Referring particularly to Fig. 4, it will be seen that a setting sleeve 57 is formed with transverse openings 60 through the side wall thereof to accommodate ball bearings 61. A shifting collar 62 is slidable longitudinally of the sleeve and has an inner corrugated and longitudinally tapered wall surface 63 which will ride over the ball bearings 61 and force them downwardly against expanding blocks 64. These blocks are similar to those previously designated at 52 in Fig. 2 of the drawing. The blocks have a forward face 65 which is inclined inwardly and which meets an inclined face 66 carried by a setting ring 67. The ring has an outwardly inclined seat 68 which engages the back tapered faces 21 of gripping jaws 17. Thus, as the shifting collar 62 is moved in the direction of the arrow $a$ in Fig. 4 the tapered face 63 will be drawn over the balls 61 to force them inwardly against a block 64 and to cause the blocks to exert an end force against the ring 67. This will set the chuck jaws. The collar 62 is provided with an annular groove 69 which may receive the pin 53 of the shifting yoke 54 or other means, such as shown in Fig. 5 of the drawing.

Referring more particularly to Fig. 5 of the drawing it will be seen that the collar 51 is embraced by a shifting ring 70 carrying pins 71. The ring also is fitted with a handle 70' by which the ring may be rotated around the axis of the chuck. The ring is fitted with a pin 72 which extends through the end of a link 73. The opposite end of the link is pivoted to a relatively fixed portion of the machine tool, as indicated at 74, by a pin 75 passing through a bracket 76. It will thus be seen that as the ring 70 is rotated the link will force the ring to move longitudinally of the axis of the chuck and simultaneously move the collar 51 by engagement of the pins 71 carried by the ring.

In Fig. 6 of the drawing another form of the invention is shown in which a shifting ring 77 is disclosed as circumscribing the chuck collar 51. This ring is fitted with a handle 78 by which it may be rotated circumferentially of the collar 51 and around the longitudinal axis of the chuck. Shifting pins 79 are carried by the ring and engage a groove 80 in the collar. The ring 77 is formed with an obliquely disposed slot 81 which receives a pin 82. The pin is carried by a bracket 83 mounted upon a fixed portion of the machine carrying the chuck. It will be understood that while the obliquely disposed slot 81 and the pin 82 are described as being formed in the ring and in the bracket 83, that the position of these elements may be reversed in these two members. In either event it will be obvious that as the ring 77 is rotated around the longitudinal axis of the chuck by the handle 78 that the shifting pins 79 will engage the groove 80 in the collar 51 and shift the collar longitudinally.

It will thus be seen that the chuck construction here disclosed provides a simple and effective chuck of the collet type and insures that a rotating force may be imparted to a piece of work stock without the use of positive gripping means and in a manner to insure that the stock may be gripped and released while the chuck is continuously in motion, and that it will be held by a friction action which would prevent the stock from being damaged in the event that it might be engaged by a tool and held against rotation.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

1. A collet chuck adapted to be mounted upon a tubular driving spindle, comprising a head formed with a threaded hub within which the threaded end of the driving spindle is positioned, a central passageway through said head, the outer portion of said passageway being formed with an inwardly tapered seat, a gripping jaw unit comprising a ring to which a plurality of radially movable gripping jaws are yieldably mounted, said jaws each being formed with an inclined face adapted to engage the tapered face within the passageway of said head and an inwardly inclined outer face, a setting sleeve embracing the head and the gripping jaws and formed with an inwardly inclined end face engaging the last named inclined faces of the gripping jaws and formed with a bore by which the sleeve is rotatably mounted upon the head, a cylindrical hub formed upon the rear end of the head, a shifting collar freely rotatable thereon and movable longitudinally thereof, an expanding cone formed at the forward end of said collar, expanding blocks arranged around the hub of said head, the forward faces thereof engaging a shoulder on said head, the rear faces of said blocks being formed with outwardly inclined surfaces, said blocks being encircled by the setting sleeve, and a ring nut carried by the encircling portion of said setting sleeve being formed with a passageway through which said expanding cone may move longitudinally, said ring nut being formed with a tapered seat to engage the rear tapered faces of the expanding blocks and whereby forward movement of the shifting collar and its cone will force the expanding blocks outwardly between the inclined seat of the ring nut and the shoulder on the head and thus draw the setting sleeve rearwardly over the head to force the gripping jaws rearwardly and inwardly to a gripping position and to create a frictional driving action between the head and the setting sleeve.

2. The structure of claim 1 including yieldable means interposed between the head and the sleeve tending to oppose said action.

ROBERT E. WILSON.